United States Patent Office 3,479,248
Patented Nov. 18, 1969

3,479,248
**PROCESS FOR SOLUBILIZING THE HEMICELLU-
LOSE OF VEGETABLE MATERIALS AND FOR
RECOVERING THE SUGARS FROM THE SOLU-
BILIZED HEMICELLULOSE**
Luciano Nobile, Milan, Italy, assignor to Ledoga S.p.A.,
Milan, Italy
No Drawing. Filed Oct. 7, 1965, Ser. No. 493,896
Claims priority, application Italy, July 30, 1965,
17,383/65
Int. Cl. D21c *11/00*
U.S. Cl. 162—16             9 Claims

ABSTRACT OF THE DISCLOSURE

A process for the production from ligno-cellulose of a cellulose pulp (suitable for the manufacture of hardboard, paper and the like), containing the desired percentage of hemicellulose, adjustable within wide limits, and a liquor containing only pentosans, from which pure xylose can be crystallized. The process is characterized by a controlled attack of ligno-cellulose material with steam at 150°–180° C. for 1–30 minutes and by the fact that the steam-treatment as well as the successive treatments of the cellulose pulp are performed at a pH of the liquor comprised between 3.2 and 5. The hydrolysis of the pentosans containing liquor is performed, after defecation, concentration and purification, by hot treatment at a pH lower than 2, thus avoiding any degradation to furfural.

---

The present invention relates to a process for selectively solubilizing, by means of a controlled depolymerization, the hemicellulose contained in ligno-cellulose vegetable materials, and for the recovery of monosaccharides, in particular xylose, from the solubilized hemicellulose.

This depolymerization is suitably carried out in such a way as to solubilize the desired percentage, adjustable within wide limits, of the hemicellulose present in the ligno-cellulose vegetable substance while leaving the cellulose and the lignin substantially unaltered and, at the same time substantially avoiding degradation of the pentosans into furfural.

The above is achieved by subjecting the comminuted vegetable material to a number of operations which start with thermal treatment under steam atmosphere of said material and end with dewatering the pulp obtained, comprising the intermediate operations such as defiberization etc. and are all carried out while conveniently adjusting the pH of the solution in contact with the vegetable material, as well as the temperature, pressure and length of the thermal treatment; by subjecting the depolymerization liquid, after its separation from the pulp and containing the solubilized hemicellulose together with various impurities such as coloring substances, tannins, pectins, humic acids, etc., to a particular treatment of depuration, transformation and recovery comprising a defecation, a hydrolysis with mineral acid of the hemicellulose poly- and oligo-saccharides to transform them into monosaccharides, a treatment with decoloring, decationizing and deanionizing exchange resins. All these operations are carried out at established pH and concentrations, and finally a neutral sugary liquid is obtained from which, after concentration and crystallization, are recovered crystallized xylose and mother liquors consisting of mixtures of other substantially pure monosaccharides.

More precisely, the process of the present invention, having a very wide application because applicable in general to various species of vegetable substances such as for instance to woods of shade trees: beech, poplar, chestnut wood, etc., conifers such as pine and fir wood, etc., as well as to vegetable residues such as bagasse, stubble, rice hulls, maize corncob residues, etc., results on the one hand in a pulp containing substantially all the lignin and the cellulose of the treated raw material as well as amounts, variable at pleasure within wide limits, of hemicellulose, and on the other hand, good yields of pure xylose and sugary mother liquors, while substantially avoiding the disadvantage of transforming part of the pentosans into furfural.

At the same time the process of the present invention resolves in an extremely economical way the difficult problem of getting rid of the liquid residues from said treatment which, on account of their high content of organic substances, cannot be discharged directly into the water-courses since this would cause their pollution followed by heavy damage, among other things, to the water fauna and flora. On the other hand, according to the present process said liquids are treated as already mentioned and as will be described more fully hereinafter, the water which is separated from them can be recycled or discharged into the sewer without drawback.

A particularly advantageous feature of the process according to the invention is that, in contrast to the known processes achieving the separation of the hemicellulose from vegetable substances by treatment with mineral acids, or acid salts, or at any rate at decidedly acid pH, it has no degrading effect whatever on the cellulose or on the lignin, but has the advantage of avoiding the solubilization of the cellulose hexosans the presence whereof, also under form of hexoses, hinders, as is known, the subsequent recovery of the pentoses.

Another particularly advantageous feature of the process according to the invention is that it permits an easy but nevertheless excellent depuration of the depolymerization liquids which is made difficult by the above mentioned various impurities therein contained and which must be completely and suitably removed in order to obtain good yields of crystalline xylose.

The process according to the invention is very useful as for instance:

(a) For hardboard manufacture, in particular in the case of hardboard obtained through the known wet process, since it permits removal, from the vegetable substance, only that portion of hemicellulose which permits such a good cellulose defiberization as to obtain hardboards having an adequate mechanical resistance. We have found, in fact, that an excessive solubilization of the hemicellulose of the vegetable material gives rise to mechanically deficient hardboards with the consequence, furthermore, of a lower production of wood hardboard;

(b) For the processes of cellulose manufacture for paper, rayon, etc. in which, for instance, the known sulphate treatment is used. In fact, when subjecting the vegetable materials to a pretreatment according to the process object of this invention, which as already said exerts no degrading effect on the cellulose nor causes lignin condensation reactions hindering, as is known, the subsequent delignification. It is possible to reduce the volume of the necessary equipment and the consumption of chemical reactants for the sulphate process, and to obtain also as by-product and with excellent yields, valuable pentose sugars.

The process according to the present invention will now be described more in detail.

The depolymerization is carried out by subjecting the vegetable material to a thermal treatment under steam atmosphere, at a pH of from 3.2 to 5 and at a temperature comprised within 150–180° C., for a time of 1 to 30 minutes; the pH, which is that of the aqueous solution contacting the vegetable substance, is adjusted by varying conveniently the conditions of temperature and time of the thermal treatment and, if necessary, by buffering the said solution in a suitable way so as to get the pH at its optimum value.

The choice of the depolymerization conditions depends mainly on the type, on the subdivision grade and on the pretreatments, if any, of the vegetable material, on the hemicellulose percentage to be extracted, and on the use to which the pulp is destined. Said conditions must be chosen each time as a function of the type of material to be treated, etc., as above stated, and keeping in mind that hard woods and high hemicellulose extractions require in general more severe conditions.

According to a preferred embodiment of the process of the present invention, within the earlier defined conditions, the vegetable material subjected to thermal treatment has a water content of 20–65%; said treatment is carried out continuously, in one or more autoclaves heated with direct steam; the subsequent handling of the pulp upon its de-watering, comprises at least one defiberization in vapour phase and at least one defiberization in liquid phase, and said defiberizations are achieved by means of the known defibrators having opposed disks in the clearances whereof flows the pulp.

Many modifications can of course be made to the above described treatment while always remaining within the limits of this invention. For example, the heating of the autoclave can be carried out with high temperature flue gases; the thermal treatment can be carried out in more phases each at a different temperature and/or pH, etc.

As aforesaid, the finally obtained pulp can be used directly for hardboard manufacture or it can be subjected to further treatments to obtain cellulose by known processes.

The treatment of the depolymerization residual liquid comprises, for the sugar recovery, the following phases:

(1) Defecation of the liquid by means of a suitable flocculating agent as for example aluminium sulphate, ferric sulphate, soluble lead salts, "Separan" (registered trademark of Dow Chemical for flocculating agents on the basis of acrylamide, etc.), at a pH adjusted between 4 and 5;

(2) Elimination of the greatest part of the cations present, by means of a strongly acid cationic exchange resin. In this way the pH of the liquid is lowered and the freed hydrogen-ions are utilized in the subsequent phase of hydrolysis of the polymeric sugars. Thus the purification of the liquid and, at the same time, the elimination or reduction of the successive addition of acid necessary for the cited hydrolysis, are obtained;

(3) Pre-concentration of the obtained solution up to 10–15% of reducing sugars (calculated after complete acid hydrolysis).

Alternatively, it is possible to reverse points 2 and 3 i.e. preconcentrating the defecated liquid up to the indicated concentration and then passing the concentrated liquid to the treatment with cationic resin;

(4) Hydrolysis of the polymeric sugars after addition, if any, of mineral acids until a pH lower than 2, preferably between 0.5 and 0.8, is obtained, by reflux boiling for 1–3 hours.

This operation, besides having the cited scope, also achieves the coagulation of the colloidal substances still present, such as humic acids, pectins, etc., and therefore permits one to obtain, in the subsequent filtration, a perfectly limpid and stable solution;

(5) Purification of the hydrolized liquid of all its impurities (coloring substances, organic and inorganic acids, salts, etc.), by passing the liquid through ion exchange resin beds, in the following order:

(a) Decoloring resins (decoloring and fixation of the demolition products of tannin and the like);

(b) Weakly or moderately basic anionic resin (elimination of the strong acids);

(c) Strongly acid cationic resin (elimination of the cations);

(d) Strongly basic anionic resin (elimination of the weak acids and of the traces, if any, of tannin residue and of other colored demolition products).

The decolorization, if tannin is present, is preferably carried out by using two types of decoloring resins of different category;

(6) Concentration of the de-ionized and decolored liquid until a syrup with a content of 70 to 85% of dry substance is obtained;

(7) Crystallization of the syrup while slowly stirring and gradually cooling according to particular time-temperature diagrams which depend on the type of sugary solution, the characteristics of which are a function of the starting vegetable substance and of the depolymerization methods;

(8) Centrifugation of the syrup containing the crystals, washing and drying of the crystals.

The centrifugation mother liquors consisting mainly of xylose and of variable amounts of other pentoses and hexoses, after hydrogenation find useful employment in the production of marmalades for diabetic persons or they may be used, either as such or modified, as antioxidants in the preservation industry (fish and meat).

The process object of the present invention is illustrated hereinafter for the purpose of exemplification by the following non-limiting examples relating to the employment of beech wood and of the liquid residues from the thermal treatment of chestnut wood.

EXAMPLE 1

Comminuted beech wood containing about 30% of water is introduced into an autoclave and heated to 180° C. by direct saturated steam at 10 atm. for 5 minutes; then the wood is defiberized in vapour phase through a disk defibrator, expanded to atmospheric pressure, and water is added in a wood: water ratio of 4:96. By operating in this way, a fibre suspension is obtained having a pH of 4.7; said suspension is then subjected to refining in the liquid phase.

The fibre suspension is de-watered and the wood pulp obtained is treated to obtain hardboards according to known processes. The produced hardboards which result are excellent in every respect.

The analysis revealed that the initial hemicellulose content of the wood had reduced by about 15%.

1000 litres of liquid which was separated by the said de-watering of the wood pulp, having the following analysis:

| | G./l. |
|---|---|
| Total of reducing sugars [1] | 11.18 |
| Pentoses [1] | 9.82 |
| Ash content | 0.84 |

[1] Determination upon complete hydrolysis.

are treated with 0.8 kg. of commercial aluminum sulphate in powder, at temperatures of 30–50° C.

Flocculation occurs almost immediately; then the solution is filtered in a filter press on which washing in countercurrent is carried out.

A total of 985 litres of clear solution is obtained having a total sugar content of 9.88 g./l. whereof 8.26 g./l. of pentoses at pH 4.5.

The solution is then passed through a column containing a volume of cationic exchange resin of strongly acid type and activated in acid cycle, corresponding to the amount of cations present in the solution, on the basis of the exchange characteristics of said resin.

At the outlet, the solution has a pH of 1.6, a volume of 1020 l., an ash content of 0.12 g./l.

The said liquid, after concentration under vacuum to a volume of 82 l., has the following analysis:

| | | |
|---|---|---|
| Total sugars | g./l. | 108.5 |
| Pentoses | g./l. | 93.4 |
| pH | | 0.8 |

0.530 kg. of $H_2SO_4$, previously diluted with a small amount of water, are added to the liquid which is then subjected to reflux boiling for 1 hour and 30 minutes.

At the end of the boiling, the liquid is cooled and filtered. The insoluble residue is washed with cold water.

91 l. of clear solution are obtained having a content of 91.8 g./l. of total reducing sugars and 81.1 g./l. of pentoses, and a pH of 0.6.

This solution is then pumped into a six-column battery placed in series and filled with exchange resins of the following type and in the following order:

(1) polyfunctional decoloring resin of sulphonated carbon type,
(2) polyfunctional decoloring resin of sulphonated carbon type,
(3) polyfunctional decoloring resin of aromatic amine type,
(4) moderately basic anionic exchange resin,
(5) strongly acid cationic exchange resin,
(6) strongly basic anionic exchange resin.

From the column battery, after exhaustion by washing the adsorbed sugars, a colorless solution is obtained, at pH 7.0, corresponding to 134 litres with a content of 49.2 g./l. of total sugars, which solution is evaporated under vacuum until a residue of 80% by weight of total sugars, namely 8.210 kg., is obtained.

After 48 hours of crystallization while gently stirring and slowly cooling, 4.510 kg. of dried xylose crystals and 3.700 kg. of non-crystallizable syrup containing 55% of total sugars are obtained by centrifugation. The syrup is then concentrated again to a content of 70% of sugars equal to 2.900 kg. containing 82% of xylose and 18% of other sugars.

The perfectly white crystalline xylose exhibits the following characteristics:

| | |
|---|---|
| Melting point ° C. | 143.5–145.5. |
| Specific rotatory power at 20° C. | +18.5°. |
| Water | 0.35%. |
| Ash content | Traces. |
| Metals | None. |
| Chlorides | None. |
| Sulphates | None. |
| Acidity | Lower than 0.015% (as acetic acid). |

EXAMPLE 2

1000 litres of a liquid, separated by dewatering the wood pulp of beech wood subjected, after tannin extraction, to the treatment of controlled depolymerization according to the present invention, are used.

Said liquid, after treatment as in the preceding example, shows the following analysis:

| | |
|---|---|
| Total reducing sugars [1] | g./l. 17.3 |
| Pentoses | g./l. 14.0 |
| Ash content | g./l. 1.4 |

[1] Determination upon complete hydrolysis.

The liquid is flocculated at pH 4.3–4.5 with 1.3 kg. of aluminum sulphate at about 30° C., then filtered and washed in countercurrent.

995 litres of a clear solution are obtained, having a total sugar content of 15.24 g./l. whereof 12.32 g./l. of pentoses.

The solution is sent through a cationic exchange resin bed of strongly acid type.

At the outlet, the solution has a pH of 1.7, a volume of 1030 l., an ash content of 0.25 g./l.

The acid liquid which was concentrated under vacuum up to a volume of 99 l. shows the following analysis:

| | |
|---|---|
| Total reducing sugars | g./l. 132.5 |
| Pentoses | g./l. 112.9 |
| pH | 0.9 |

0.690 kg. of $H_2SO_4$, previously diluted with a small amount of water, are added to the liquid which is then subjected to reflux boiling for 1 hour and 30 minutes.

Thereafter the liquid is cooled and filtered. The insoluble residue is washed with cold water.

110 litres of a clear solution are obtained having a content of total reducing sugars of 118.0 g./l. and 100.6 g./l. of pentoses, and a pH of 0.6.

The solution is pumped into a 6-column battery, containing exchange resins of the following type and in the following order:

(1) polyfunctional decoloring resin of sulphonated carbon type,
(2) polyfunctional decoloring resin of sulphonated carbon type,
(3) polyfunctional decoloring resin of aromatic amine type,
(4) moderately basic anionic exchange resin,
(5) strongly acid cationic exchange resin,
(6) strongly basic anionic exchange resin.

From the column battery, after exhaustion by means of washing the adsorbed sugars, a colorless solution at pH 7.0 corresponding to 180 l. is obtained, having a total sugar content of 55.7 g./l., which solution is evaporated under vacuum until a residue of 82% by weight of total sugars, namely 12.200 kg., is obtained.

After 48 hours of crystallization while gently stirring and slowly cooling, 7.00 kg. of dry xylose crystals and 5.200 kg. of non-crystallizable syrup containing 57.7% of total sugars are obtained by centrifugation.

The syrup is then concentrated again to a content of 70% of sugars, equal to 4.280 kg., containing 80% of xylose and 20% of other sugars.

The perfectly white crystalline xylose exhibits practically the same characteristics as given in Example 1.

I claim:

1. In a process for the production (1) of cellulose pulps suitable for the manufacture of hardboard, paper and the like, (2) of pure crystalline pentoses and (3) of sugary syrups from ligno-cellulose materials comprising the steps of comminuting said ligno-cellulose materials, subjecting said comminuted ligno-cellulose materials to the thermal treatment and de-watering the resultant pulp, the improvement comprising carrying out all steps between comminuting and de-watering at a pH between 3.2 and 5, conducting said thermal treatment at a temperature in the range from 150° to 180° C. in a steam atmosphere for 1 to 30 minutes, and recovering said crystalline pentoses and sugary syrups from the liquids separated from said pulp by a process comprising pre-concentrating said liquid to a concentration of 10–15% sugars; defecating said liquid with a flocculating agent at pH 4–5; passing the defacated liquid over a strongly acid cationic exchange resin; heat treating at pH lower than 2, preferably between 0.5 and 0.8; then passing the thus treated liquid successively over decoloring resins, over a strongly acid cationic resin, and over a strongly basic anionic resin; concentrating the de-ionized and decolored liquid to 70–85% of dry substance; crystallizing the syrup under gentle stirring and gradual cooling; separating by centrifuging the crystallized pentoses, essentially of xylose, from the residual sugary syrup containing essentially pentoses and hexoses.

2. A process according to claim 1 wherein the comminuted ligno-cellulose subjected to said thermal treatment contains from 20 to 65% water.

3. A process according to claim 1 wherein said thermal treatment is carried out by means of direct steam.

4. A process according to claim 1 wherein the comminuted and thermally treated ligno-cellulose is defiberized in a steam atmosphere.

5. A process according to claim 1 wherein said ligno-cellulose material is chestnut wood.

6. A process according to claim 1 wherein said lignocellulose material is beech wood and wherein said beech wood, after being comminuted, is placed in an autoclave and heated by direct steam to 130° C. for about 5 minutes and is thereafter mixed with water to obtain a pH between 4.4 and 4.9.

7. A process according to claim 1 wherein said flocculating agent is aluminum sulfate.

8. A process according to claim 1 wherein the pH of said defecated liquid is lowered to a value of less than 1.5 during passage over the cationic exchange resin.

9. A process according to claim 1 wherein the pH of said liquid after passage through the last exchange resin bed is about 7.

References Cited

UNITED STATES PATENTS

| | | |
|---|---|---|
| 2,224,135 | 12/1940 | Boehm. |
| 2,759,856 | 8/1956 | Saums et al. _____ 127—37 |
| 2,926,110 | 2/1960 | Shimizu et al. _____ 127—46 |

OTHER REFERENCES

"Cane Sugar Handbook," 8th edition, pp. 798, 800, John Wiley and Sons, New York, 1945.

MORRIS O. WOLK, Primary Examiner

S. MARANTZ, Assistant Examiner

U.S. Cl. X.R.

127—37, 40, 46; 162—68